(12) United States Patent
Cherry et al.

(10) Patent No.: US 9,449,250 B1
(45) Date of Patent: Sep. 20, 2016

(54) IMAGE DOWNLOAD PROTECTION

(71) Applicant: Amazon Technologies, Inc., Reno, NV (US)

(72) Inventors: Jordan Carl Cherry, Seattle, WA (US); Christopher Pitstick, Seattle, WA (US); Jeffrey David Backer, Tempe, AZ (US); Ganesh Kumar Gella, Bellevue, WA (US); Craig Joseph Mouser, Tempe, AZ (US); Tengfei Li, Seattle, WA (US); Daniel Paul Kirschner, Seattle, WA (US); Pratik Prakash Shah, Seattle, WA (US); Atacan Conduroglu, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 23 days.

(21) Appl. No.: 14/085,569

(22) Filed: Nov. 20, 2013

(51) Int. Cl.
*G06K 9/46* (2006.01)
*G06T 1/00* (2006.01)

(52) U.S. Cl.
CPC ............ *G06K 9/4652* (2013.01); *G06T 1/0021* (2013.01)

(58) Field of Classification Search
CPC .................. H04H 2201/50; H04N 21/8358; H04N 1/32144; G06F 17/30058; G06F 17/30905; G06F 21/10; G06F 21/84; G09G 5/024; G09G 5/026; G07F 17/3211; G06T 2207/10016; G06T 2207/20224; G06T 1/0021; G06K 9/4652
See application file for complete search history.

(56) References Cited

U.S. PATENT DOCUMENTS

| | | | |
|---|---|---|---|
| 7,559,034 B1 * | 7/2009 | Paperny et al. | 715/803 |
| 2003/0035917 A1 * | 2/2003 | Hyman | B41M 1/30 428/67 |
| 2003/0128861 A1 * | 7/2003 | Rhoads | G06F 17/30876 382/100 |
| 2005/0001419 A1 * | 1/2005 | Levy | B41M 5/24 281/2 |
| 2005/0195216 A1 * | 9/2005 | Kramer | G06F 3/14 345/619 |
| 2005/0246627 A1 * | 11/2005 | Sayed | G06F 17/248 715/234 |
| 2006/0044599 A1 * | 3/2006 | Lipowitz | G06Q 30/0641 358/1.15 |
| 2006/0050086 A1 * | 3/2006 | Ono | G06T 11/60 345/629 |
| 2007/0143308 A1 * | 6/2007 | Takayama | G06F 17/30905 |
| 2008/0049971 A1 * | 2/2008 | Ramos | G06F 17/30026 382/100 |
| 2009/0167870 A1 * | 7/2009 | Caleca | H04N 1/00132 348/207.1 |
| 2010/0057566 A1 * | 3/2010 | Itzhak | 705/14.53 |
| 2012/0183210 A1 * | 7/2012 | Zheng | G06T 5/009 382/162 |
| 2012/0240243 A1 * | 9/2012 | Allardyce | 726/28 |
| 2012/0268488 A1 * | 10/2012 | Masuko | H04N 1/3876 345/629 |
| 2013/0201498 A1 * | 8/2013 | Boggs | H04N 1/60 358/1.9 |
| 2015/0213632 A1 * | 7/2015 | Trask | G06T 11/60 715/234 |

* cited by examiner

*Primary Examiner* — Vu Le
*Assistant Examiner* — Kenny Cese
(74) *Attorney, Agent, or Firm* — Kilpatrick Townsend & Stockton LLP

(57) ABSTRACT

Techniques for providing an image download protection may be provided. In particular, an original image may be protected from being downloaded by providing a substitute image in its place, identified by a plurality of layers that are configured to look substantially similar to the original image. However, when a user device attempts to quickly store the image (e.g., by right-clicking on the image and selecting "save"), the user device can be hindered from downloading the substantially similar looking image because only one layer may be stored on the user device. In some examples, the layer of the image looks substantially distinct from the original image, but the layer in combination with a plurality of other layers can look substantially similar to the original image.

21 Claims, 9 Drawing Sheets

IMAGE DOWNLOAD PROTECTION

BACKGROUND

Digital images displayed on network pages are difficult to protect from being downloaded and/or reused. For example, by providing a location (e.g., uniform resource locator (URL)) of the digital image through hypertext markup language (HTML), the digital image is available to be downloaded, and essentially given away, either to the user who right-clicks on the image, to a browser that downloads and stores the image in local cache/memory, or to a user who finds the URL of the image in the page source code (e.g., via HTML). In some examples, the right-click functionality may be turned off or disabled (e.g., through instructions with a browser application), such that users cannot download digital images using the right-click. However, the functionality can be broken or worked around.

BRIEF DESCRIPTION OF THE DRAWINGS

Various embodiments in accordance with the present disclosure will be described with reference to the drawings, in which.

DETAILED DESCRIPTION

Figure 1:
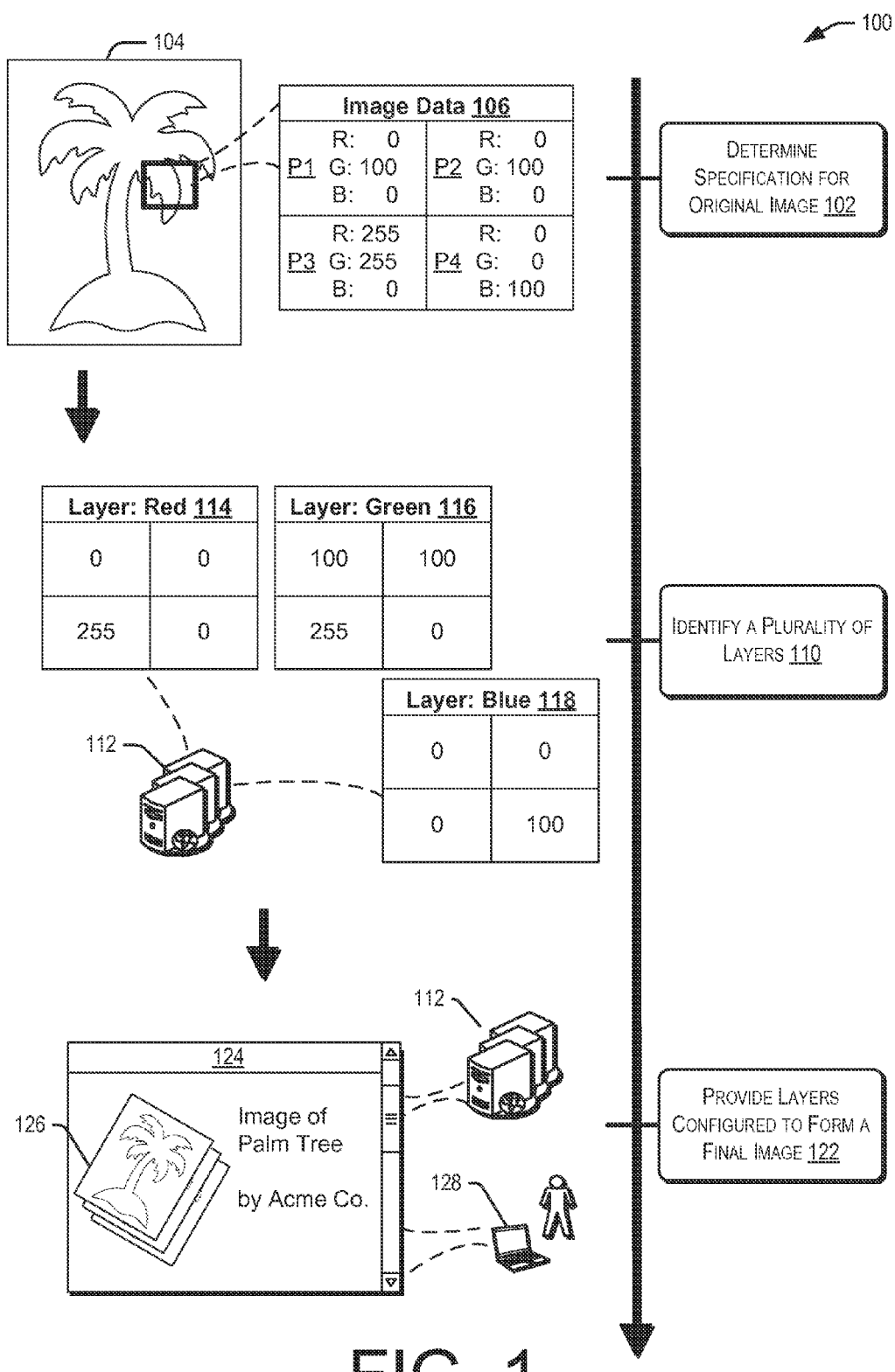
FIG. 1 illustrates an illustrative flow for providing image download protection described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for protecting electronic files from being easily downloaded by users. In particular, an original image may be protected from being downloaded by providing a substitute image in its place, identified by a plurality of layers that are at least partially overlapped to look substantially similar to the original image. However, when a user attempts to quickly store the image (e.g., by right-clicking on the image and selecting "save," or working around the disabled right-click functionality), the user device can be hindered from downloading the substantially similar looking image because only one layer may be stored on the user device. In some examples, each layer of the image may look substantially distinct from the original image, but one layer in combination with a plurality of other layers can look substantially similar to the original image.

In a non-limiting example, a high-resolution image may be available for purchase through an e-commerce system. The system may use the original image to form a layered image that is provided to a network page. The layers can form a replica of the high-resolution, original image, so that when the user views the image, the image looks substantially similar to the high-resolution image. The layers may be overlapped at the network page, sequentially presented to the user at a sufficient speed to appear the same as the original image, or may otherwise be combined to form an image other than the original image. However, if the user attempts to download the image by right-clicking on the layered image or if the user attempts to take a screen shot of the network page, the user may instead select one layer of the image, as opposed to the entire image. In some examples, one or more layers of the image may be restricted to a particular color, transposed image, watermark, or other electronic file that is substantially different from the high-resolution image. In some examples, this image download protection process can include determining a specification of the high-resolution image, identifying layers based on the specification, and providing the layers to a user (e.g., overlapped and/or sequentially, at a sufficient speed to "blend" the layers), instead of the high-resolution image.

The original image may be an image that is desired to be protected from being downloaded by one or more user devices, including a high-resolution, copyright-protected, or other type of image. In some examples, the original image may be an image offered as an item for purchase in an electronic marketplace or through an e-commerce system. In some examples, the original image may visually represent, to a user, an item offered by an electronic marketplace of items. When the original image is the item that is offered in an electronic marketplace, an unprotected original image may be downloaded by a user device without restriction, so the user can attempt to avoid purchasing the image through the marketplace.

A specification for the original image may be used to define the visual aesthetics of the original image in an electronic format. In some examples, the specification is a red-green-blue (RGB) specification that defines an RGB value for one or more pixels in the original image. When the RGB specification is provided to a network page, the network page is able to generate the original image. In some examples, the specification is a cyan-yellow-magenta-black (CYMK) specification that defines a CYMK value for one or more pixels in the original image. Similarly, the CYMK specification may be provided to the network page, so that the network page is able to generate an image based in part on the CYMK specification. In these examples, the RGB specification and the CYMK specification may produce substantially similar images at a network page, even though the specifications differ. Other examples of specifications may incorporate one or more watermarks, portions (e.g., masked portions, sections of an image), RGBA, and/or grayscale specifications.

Each of the pixels in the original image may be associated with one or more values. For example, an original image may be a 10 pixel by 10 pixel image that includes 100 pixels total. When correlated with a particular specification, each of the 100 pixels in a RGB specification may include three values, one value for the amount of red associated with the pixel, one value for the amount of green associated with the pixel, and one value for the amount of blue associated with the pixel.

A layer may include a definition of one or more pixels and/or one or more operations for an object or image file (e.g., an altered image, a final image). In some embodiments, one or more layers may be incorporated with specifications and values. For example, the image may be a 10 pixel by 10 pixel image associated with an RGB specification. Each of the 100 pixels in the image can be associated with one or more values. When one or more layers are incorporated, each layer may be associated with a single color identified in the original image. For example, a first layer can include each 100 pixels that define the red values in the image, a second layer may include the 100 pixels that define the green values in the image, and the third layer may include the 100 pixels that define the blue values in the image.

The final image may be an image that looks substantially similar to an original image. For example, the final image may be provided as a preview of the original image, or may accompany a description of the original image. In some examples, the final image may be an image formed to look like an original image, but when a user device attempts to download the final image, the stored final image would look substantially distinct from the original image. In some examples, the final image is used in part to identify an item in an electronic marketplace. In some examples, the final image may comprise a combination of one or more layers to form a visual representation that appears substantially similar to the original image.

The original image, altered image, or final image may be encoded and/or compressed (e.g., lossy, lossless) independent of the image download protection. Various standards can be used to define how the image is, for example, compressed into a stream of bytes and decompressed back into an image. Some standards or image formats can include a Joint Photographic Expert Group (JPEG) standard, a portable network graphics (PNG) standard, graphic interchange format (GIF), bitmap (BMP) image format, or any other encoding and/or compression standards.

In an e-commerce setting, a final image can be used to help protect an original image from being fraudulently downloaded. For example, when the original image is an item for purchase in an electronic marketplace (e.g., a high-resolution, copyrighted image), the final image can be provided to help describe the original image offered for purchase, visually represent (e.g., to a user), or identify an item in an electronic marketplace, but not allow the original image to be downloaded without purchase.

FIG. 1 illustrates an illustrative flow for providing image download protection described herein, according to at least one example. In a non-limiting example, the method 100 can determine a specification for an original image 102. For example, the system may first receive an original image 104. The original image 104 can include one or more pixels that are shown substantially adjacent to each other to form the original image. In some examples, the original image may be available for purchase or as part of an advertisement for an item through an e-commerce system.

In some examples, the method may identify image data 106 for the original image. For example, the system can identify the number of pixels in the original image (e.g., 100 pixels total), a specification for the original image (e.g., RGB, CYMK, B/W), one or more values for each of the pixels (e.g., 0-255), or any other image data used to define an original image. For example, as shown in FIG. 1, pixel 1 includes a value of 0 for R, a value of 100 for G, and a value of 0 for B; pixel 2 includes a value of 0 for R, a value of 100 for G, and a value of 0 for B; pixel 3 includes a value of 255 for R, a value of 255 for G, and a value of 0 for B; and pixel 4 includes a value of 0 for R, a value of 0 for G, and a value of 100 for B.

The method 100 may identify a plurality of layers based on or in accordance with the specification 110. In some embodiments, a computer 112 may identify a plurality of layers based at least in part on the values and/or specification associated with the original image. One or more layers in the plurality of layers can include at least a partial definition of the pixels in the image. For example, when the specification is a RGB specification, one layer may correspond with the red value in each pixel 114, one layer may correspond with the green value in each pixel 116, and one layer may correspond with the blue value in each pixel 118.

The method 100 may also provide image layers configured to form a final image 122. In this example, when the red layer, green layer, and blue layer are configured to at least partially overlap or provided in a particular order on a network page, the combination of the layers can form a final image that appears to be substantially similar to the original image when the final image is viewed at the user device. In another example, when the cyan layer, a yellow layer, a magenta layer, and a black layer are at least partially overlapped or provided in a particular order, the combination of layers can form the final image. In yet another example, when the specification includes a watermark specification, the plurality of layers can include at least one watermark layer.

The system 112 can provide the layers to a network page 124. In some examples, the layers 126 may be provided with instructions (e.g., to the network page, to a server, in HTML) that the network page can use to manage or display the layers. For example, an instruction may include <img src="mylayer.jpg"> in order to provide the image named "mylayer.jpg" on a network page.

In some examples, the layers may be provided with instructions about assembling the layers to form the final image in a particular order. For example, the instructions may include <div id="top" style="left: 150px; top: 150px; position: absolute"> <img src="mylayer1.jpg"> </div> to place the image named "mylayer1.jpg" on top and <div id="under" style="left: 100px; top: 100px; position: absolute"> <img src="mylayer2.jpg"> </div> to place the image named "mylayer2.jpg" underneath "mylayer1.jpg." In another example, the instructions may include #topLayer {position absolute; left: 150px; top: 150px; z-index: 20;} and #bottomLayer {position: absolute; left: 100px; top: 100px; z-index: 10;} to place an image associated with #topLayer on top of an image associated with #bottomLayer.

In some examples, the layers provided at the network page may be viewed by a user operating a user device 128. The layers of the image at the user device 128 may form a final image that appears substantially similar to the original image. The final image may be formed by the one or more layers, so that if the user attempts to download the image, the user may only select the top layer of the image. In some examples, the top layer of the image may be restricted to a particular color, transposed image, watermark, or other electronic file that is substantially different from the original image (e.g., high-resolution image, copyrighted image).

In some examples, the user may attempt to download the image by providing a command to the user device to save the image. The command may be received through a graphical user interface (GUI) (e.g., File>Save), keyboard (e.g., Ctrl-S, print screen), mouse (e.g., right-click button), or other methods that the user can provide to instruct the user device to save an object.

In some examples, the layers at the network page can be provided, processed, and/or rendered sequentially (e.g., by the network page to a user device). For example, a first layer may be provided for a fraction of time (e.g., millisecond, second), followed by a second layer, or vice versa. The display of one or more layers may be repeated (e.g., in a loop), so that the layers are provided multiple times. When the sequential display of layers is viewed by the user at a user device at a sufficient speed, the presentation of the layers can form a final image that is configured to appear substantially similar to the original image. However, if the user attempts to capture an image of the screen (e.g., by providing a print screen, a screen capture operation, a right click operation, or a right click instruction), a single layer may be captured (e.g., a top layer, a first layer, a watermark layer, etc.) such that the layer that appears is substantially distinct from the original image.

Figure 2:
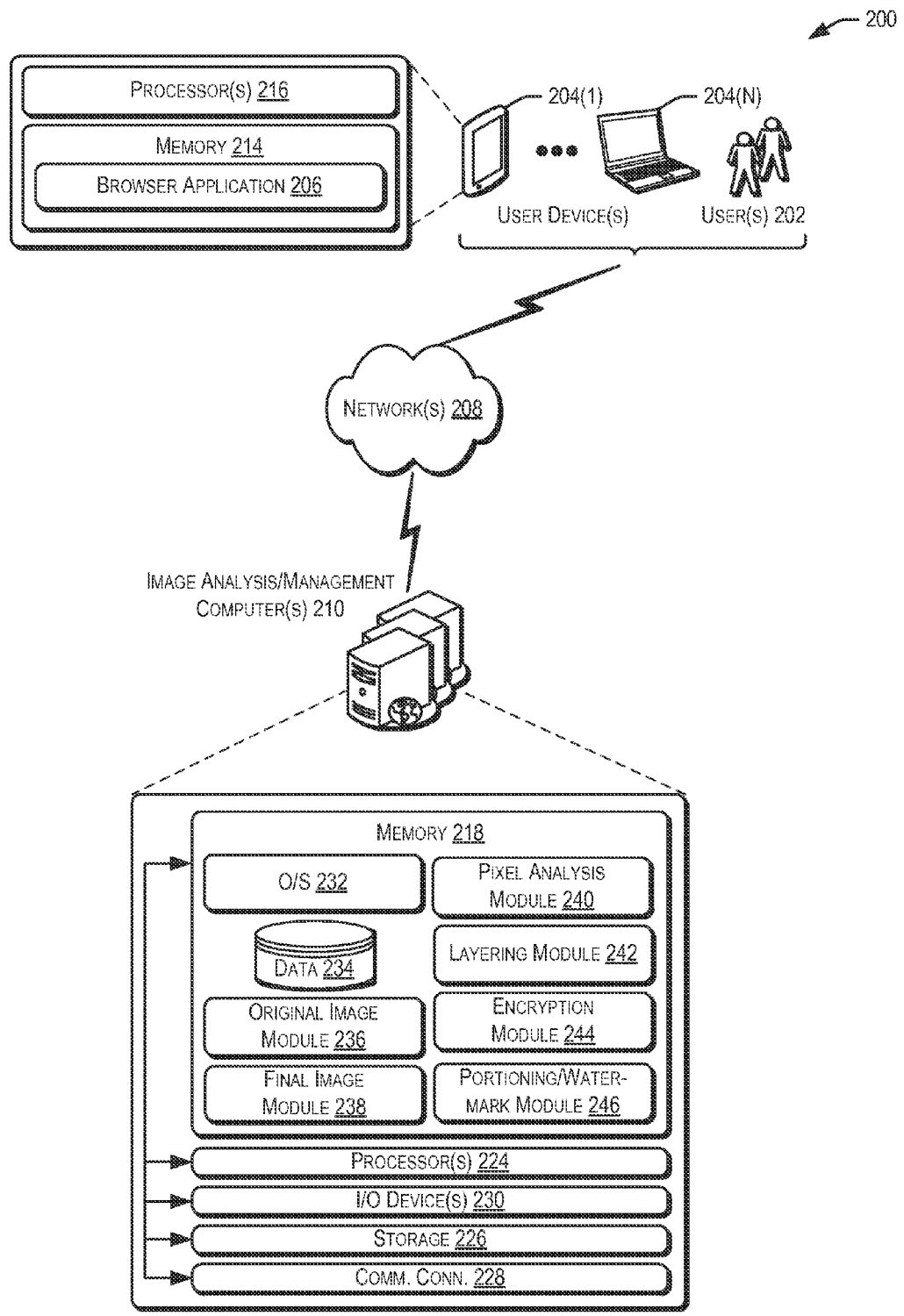
FIG. 2 illustrates an example architecture for providing image download protection described herein that includes image analysis and/or management systems and/or a user device connected via one or more networks, according to at least one example.

FIG. 2 illustrates an example architecture for providing image download protection described herein that includes image analysis and/or management systems and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more image analysis/management computers 210. The one or more image analysis/management computers 210 may, in some examples, provide computing resources such as, but not limited to, client entities, low latency data storage, durable data storage, data access, management, virtualization, cloud-based software solutions, electronic content performance management, etc. The one or more image analysis/management computers 210 may also be operable to provide web hosting, computer application development, and/or implementation platforms, combinations of the foregoing, or the like to the one or more users 202. The one or more image analysis/management computers 210, in some examples, may provide electronic image analysis/management for items.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the image analysis/management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more image analysis/management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the image analysis/management computers 210 via the networks 208, or via other network connections. Additionally, the user devices 204 may be part of the distributed system managed by, controlled by, or otherwise part of the image analysis/management computers 210 (e.g., a console device integrated with the image analysis/management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the image analysis/management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the image analysis/management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the image analysis/management computers 210 may be in communication with the user devices 204 and/or other service providers via the networks 208, or via other network connections. The image analysis/management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the image analysis/management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of image analysis/management computers 210, the memory 218 may be volatile (such as RAM) and/or non-volatile (such as ROM, flash memory, etc.). The image analysis/management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the image analysis/management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the image analysis/management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The image analysis/management computers 210 may also contain communications connection(s) 228 that allow the image analysis/management computers 210 to communicate with a stored database, another computing device or server, user terminals and/or other devices on the networks 208. The image analysis/management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an original image module 236, a final image module 238, a pixel analysis module 240, a layering module 242, the encryption module 244, and/or a portioning/watermark module 246. In some examples, the original image module 236 may be configured to receive an original image. For example, the original image may be received from an image provider that provides a high-resolution original image to an electronic marketplace for purchase (e.g. through an e-commerce system), offer for bid, or other methods of providing an image to potential consumers.

The original image module 236 may also be configured to identify one or more pixels that comprise the original image. For example, the original image module 236 may identify 1,000,000 pixels in an original image that includes a width of 1,000 pixels and a height of 1,000 pixels. The original image module 236 may also be configured to identify a resolution (e.g., 72 dots per inch (DPI)), bit depth (e.g., 24), or other image data associated with the original image.

The original image module 236 may also be configured to provide an original image to a user device after a user purchases the item in an electronic marketplace of items. In some embodiments, the original image may be provided as an electronic file (e.g., encrypted) to a user device through a messaging service, including short message service (SMS), e-mail, or via other communication channel.

The memory 218 may also include a final image module 238. The final image module 238 may be configured to provide a final image to a network page. For example, the final image may include one or more layers of images so that when the layers of images at least partially overlap, the final image looks substantially similar to the original image when viewed at the user device. In another example, the final image may include separate sections or portions of an image, so that when the portions are placed adjacently or partially overlapped each other (e.g., instructed through JavaScript® or other scripting language at a network page), the portions of the image form a final image that looks substantially similar to the original image.

The final image module 238 may also be configured to help generate instructions for a network page to retrieve the layers from various sources, including one or more locations in one or more data stores. For example, a first layer may be stored in data store A, a second layer may be stored with data store B, and a third layer may be stored in data store C. In some embodiments, the HTML provided to the network page (e.g., browser application) can be instructed where to find one or more layers and how to combine the layers to produce the final image (e.g. using a Z-index in the instructions). A Z-index can be the relative ordering in the third dimension, such that the element associated with the Z-index has a greater or lesser order than another element associated with another Z-index. In some embodiments, the one or more layers of the final image may be stored in a browser cache or otherwise stored locally on a user device.

The final image module 238 may also be configured to enable a network page to present one or more layers (e.g., a plurality of layers) sequentially. The layers may include static images that, when shown together, form the final image. For example, the network page may be enabled to present a red layer for 1 millisecond, a green layer for 1 millisecond, a blue layer for 1 millisecond, the red layer again for 1 millisecond, and so on. The presentation of the layers may be displayed at a speed (e.g., 1 millisecond per layer, 24 frames per second), that enables the presentation of the layers to form an RGB final image to a user. In some examples, when a user provides a print screen instruction (e.g., a screen capture operation) to the user device, the user device may capture only a single layer at the moment that the layer is presented and not the final image that appears substantially similar to the original image.

The memory 218 may also include a pixel analysis module 240. The pixel analysis module 240 may be configured to determine a specification for one or more pixels in an original image. For example, the pixel analysis module 240 can determine a pixel in the top, left-most corner of the image contains an RGB specification of 0-red, 100-green, and 0-blue. In some examples, the specification can define one or more values for each pixel (e.g., three values in an RGB specification, 4 values in a CYMK specification).

The memory 218 may also include a layering module 242. The layering module 242 may be configured to identify one or more layers associated with an original image (e.g., a pixel value, a watermark). For example, the layering module 242 may retrieve the specification from the data store for an original image and identify a layer for one or more portions of a specification. This may include one layer for red, one layer for green, and one layer for blue, when the final image is defined through a red-green-blue (RGB) specification.

The layering module 242 may also be configured to identify one or more layers through specifications other than RGB. For example, the layering module 242 may be configured to identify four layers in a cyan-yellow-magenta-black (CYMK) specification, including one layer for cyan, one layer for yellow, one layer for magenta, and one layer for black. In another example, the layering module 242 may be configured to identify one layer in a grayscale specification, including one layer for black color, to form a grayscale image when the black layer is displayed with the absence of color (e.g., the white pixels).

The layering module 242 may also be configured to identify translucency or transparency in one or more layers, such that the layer may include a transparent portion that allows other layers underneath the transparent portion to be viewed on a user device unimpeded. For example, when one or more layers are provided, certain pixels may provide a value associated with the translucency or transparency of that pixel in the image, so that the information in another layer can show through at a particular level.

The layering module 242 may also be configured to incorporate an alpha channel. In some embodiments, an image may be defined by a red-green-blue-alpha (RGBA) specification, which can include one layer for red, one layer for green, and one layer for blue, with an alpha channel value (e.g., "A") corresponding to the level of transparency. The alpha channel can effect of one or more levels in the final image or more or more pixels in the specification that are used to generate the final image. In some embodiments, the RGB value for the image may be 24-bits, which correspond with a zero to 255 RGB value of red, green, or blue, and the alpha channel value for the image can be 8-bits, for a total of 32-bits of image data.

The layering module 242 may also be configured to identify offset layers. In some embodiments, the layering module 242 can provide a layer in one position and a second layer in another position so that the layers are offset from each other, yet overlap. The overlapping portion of the layers can create a final image that appears substantially similar to the original image. For example, the pixel in the top, left-most corner of the top layer corresponds with the top, middle pixel in the second layer. In another example, the offset layers defined by the layering module 242 may be different sizes, so that one layer contains 100-pixels (10×10) and another layer contains 50-pixels (10×5).

The layering module 242 may also be configured to manage or define layers according to a particular order. For example, the layering module 242 may define a red layer to be placed first, a green layer to be placed second, and a blue layer to be placed third. In another example, the layering module 242 may define a particular layer as the top layer in a plurality of layers. In yet another example, the layering module 242 can interact with the final image module 238 to generate instructions for the network page, so that when the network page displays the final image on the user device, the user device displays the final image with a particular order of layers.

The layering module 242 may also be configured to dynamically identify the number of layers associated with an image. For example, the system can receive an original image and dynamically determine that a particular number of layers are needed for the image. For example, the method may determine that 47 layers may be used to sufficiently define the original image. This determination can be made using a variety of information, including providing an additional level of protection to a particularly valuable image, receiving additional fees from an item provider to provide greater protection for a particular image, or any other reason for providing additional layers. For example, the determination can be based in part on the color variety, color density, or size of the image.

The layering module 242 may also be configured to store the one or more layers in a data store. In some embodiments, the layers may be stored in different locations, including storing a first layer in data store A, a second layer with an item provider, and a third layer in data store B.

The memory 218 may also include an encryption module 244. The encryption module 244 may be configured to interact with an original image module 236 to generate an original image specification as a string of bytes. For example, the specification for an image may be "0110 0001 1100 1010" and the specification can be transmitted to a network page to be stored as HTML. In some examples, the specification can be transmitted as an encrypted string of bytes, so that the network page receives the specification for the final image as "1111 0000 1110 0001." In some examples, the string of bytes may be stored at a URL and the location of the string of bytes may be provided as HTML through a network page.

The encryption module 244 may also be configured transmit a decryption key with the string of bytes. The network page can be instructed to decrypt the string of bytes using the decryption key in order to provide a final image to the network page. In some examples, the decryption key may be provided to decrypt the final image for viewing and not be provided to decrypt the image for downloading. For example, if a user attempts to right-click on the final image, the encrypted final can be saved for the user instead of a decrypted image that looks substantially similar to the original image. In some examples, the string of bytes can identify the original image, such that when an encrypted string of bytes is decrypted by the key, the user has access to the original image and the key to decrypt it.

The memory 218 may also include a portioning/watermark module 246. The portioning/watermark module 246 may be configured to interact with the layering module 242 to incorporate one or more portions or watermarks with one or more layers. For example, a portion and/or watermark may be an object incorporated with a plurality of pixels that helps mask the image. In some embodiments, the portion and/or watermark may be defined in one layer of the plurality of layers in a final image, and provided as the top layer in the final image. When another layer in the plurality of layers in the final image is substantially overlapped with the portion and/or watermark layer (e.g., underneath the portion and/or watermark layer), the image of the portion and/or watermark is not visible with the final image. When the user attempts to right-click on the final image, the layer with the portion and/or watermark can be saved for the user instead of an image that looks substantially similar to the original image.

The portioning/watermark module 246 may also be configured to determine at least one layer in the plurality of layers that corresponds with a portion. In some examples, the portion may not be separately identified in the original image and/or visible in the final image.

The portioning/watermark module 246 may also be configured to interact with the layering module 242 to help generate a plurality of layers that can progressively neutralize (e.g., negate, blend with) the portion and/or watermark provided on the top layer. For example, the top layer can include the portion and/or watermark and three subsequent layers can include a specification that helps define the final image, including a second to the top layer that provides a specification of red pixels, the next layer that provides a specification of green pixels, and the next layer that provides a specification of blue pixels. The three subsequent layers can include a specification for the image, as well as provide an additional specification to make the portion and/or watermark not appear in the final image. The four layers can be provided to form the final image by the final image module 238. In another embodiment, one or more of the four layers can include a watermark image, so that when the layers are combined, the formed final image configured to appear substantially similar to the original image.

The portioning/watermark module 246 may also be configured to generate multiple portions and/or watermarks, such that a substantial majority of the final image is provided in portions to the network page. For example, final image can be partitioned into four portions, so that the top-left corner of the image can be one layer, the top-right corner of the image can be another layer, the bottom-left corner of the image can a third layer, and the bottom-right corner of the image can be a fourth layer. The final image can comprise the four portions of the image (e.g., overlapped, separated, adjacent to each other), so that the final image is configured to appear substantially similar to the original image. In some examples, the portions may be stored in different locations (e.g., in one or more data stores, at one or more URLs).

Figure 3:
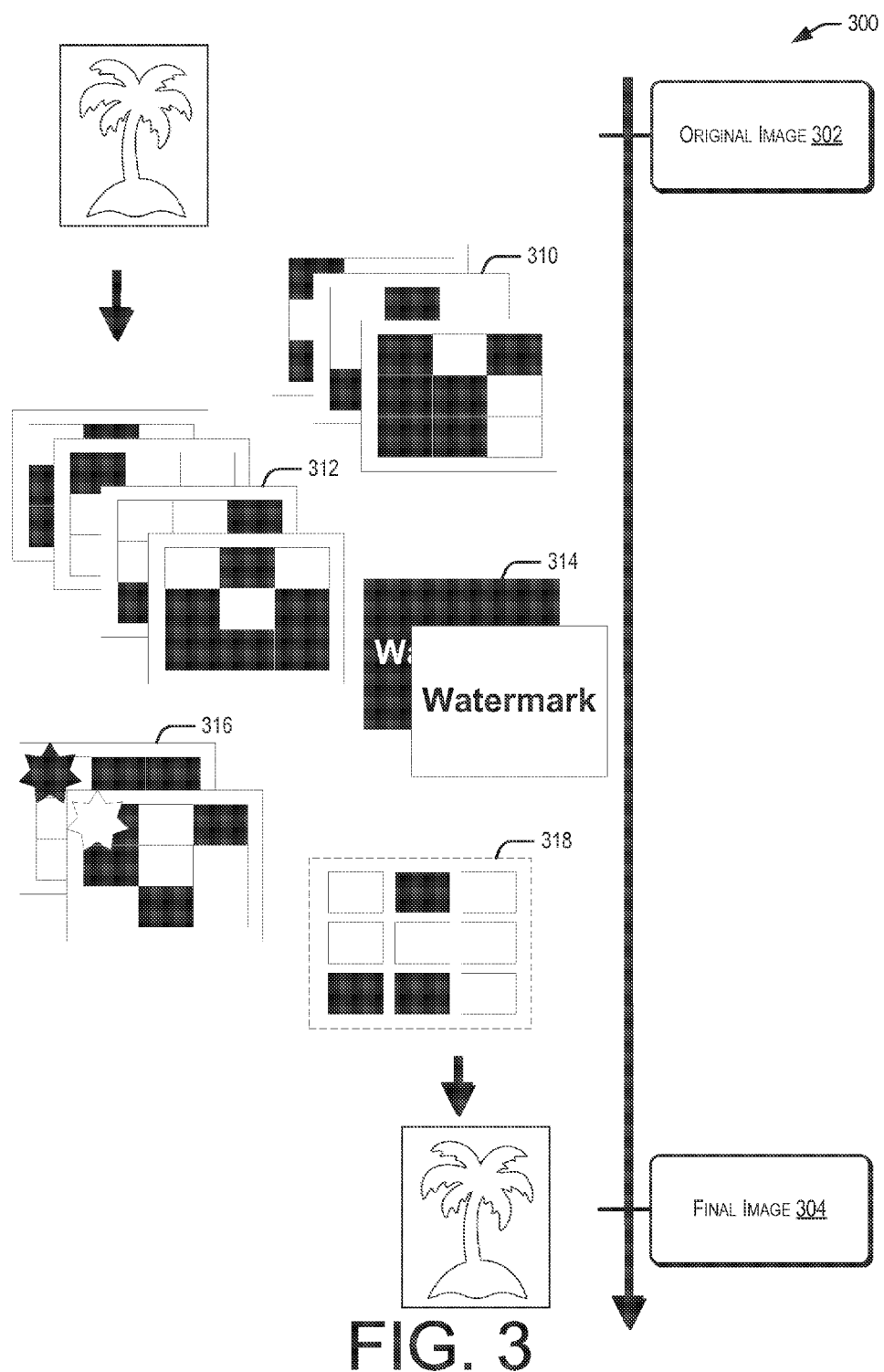
FIG. 3 illustrates various examples of translating an original image to a final image, according to at least one example.

FIG. 3 illustrates various examples of translating an original image to a final image, according to at least one example. In a non-limiting example, the method 300 may provide image protection by translating an original image 302 to a final image 304. For example, an original image can be protected by providing a final image to a user device or network page instead of the original image. In some embodiments, the original image 302 may be translated to a final image 304 through the identifying one or more layers in a plurality of layers.

In some embodiments, the layers may be associated with an RGB specification 310. The plurality of layers may include one or more layers, such that at least one layer represents the red value of a pixel, at least one layer represents the green value of a pixel, and at least one layer represents the blue value of a pixel.

In some embodiments, the layers may be associated with a CYMK specification 312. The plurality of layers may include one or more layers, such that at least one layer represents the cyan value of a pixel, at least one layer represents the yellow value of a pixel, at least one layer represents the magenta value of a pixel, and at least one layer represents the black value of a pixel.

In some embodiments, the layers may be associated with a watermark specification 314. The plurality of layers may include one or more layers such that at least one layer represents a watermark layer (e.g., including a watermark object that was not identified in the original image) and at least one of the other layers in the plurality of layers represents an object to mask the watermark. For example, the watermark may increase the values for a subset of pixels by 100-red. An object to mask the watermark may be provided on another layer that can decrease the pixel values for the subset of pixels by 100-red. When the layers are at least partially overlapped to display the final image, the watermark is not visible. However, if the user attempts to right-click on the final image, the layer with the watermark can be saved showing the subset of pixels that increase the value of the pixels by 100-red.

In some embodiments, the layers may be associated with one or more black layers to form a black and white, or grayscale image. For example, the pixel value may be 255 for a black pixel and 0 for a white pixel. A grayscale area may be formed by placing one or more black pixels next to one or more white pixels.

In some embodiments, the layers may be associated with one type of portioning specification 316. The plurality of layers may include at least one layer that represents a portion layer (e.g., including a portion object that was not identified in the original image) and at least one other layer that represents an object to mask the portion. For example, the portion may include a subset of pixels where the original values are set to another value (e.g., all values to 0 for black, all values to 255 for white). The object to mask the portion may be provided on one or more other layers, which include values that correspond to the appropriate values for the subset of pixels. When the layers are at least partially overlapped to display the final image, the portion is not visible. However, if the user attempts to right-click on the final image, the layer with the portion can be saved showing the subset of pixels that includes a black or white object where part of the image should be displayed.

In some embodiments, the layers may be associated with another type of portioning specification 318. For example, the plurality of layers may include one or more layers such that one layer is the top-left corner of the image, one layer is the top-right corner of the image, one layer is the bottom-left corner of the image, and one layer is the bottom-right corner of the image. The final image can comprise the four portions of the image (e.g., overlapped, separated, adjacent to each other), so that the final image is configured to appear substantially similar to the original image. However, if the user attempts to right-click on the final image, the layer with only one portion (e.g., the top-left corner of the image) can be saved.

In some embodiments, the plurality of layers can be associated with one or more combinations of these specifications. For example, a watermark layer may be used with an RGB specification, so that a top layer includes a watermark object, and other layers include values for red, green, or blue in one or more pixels.

Figure 4:
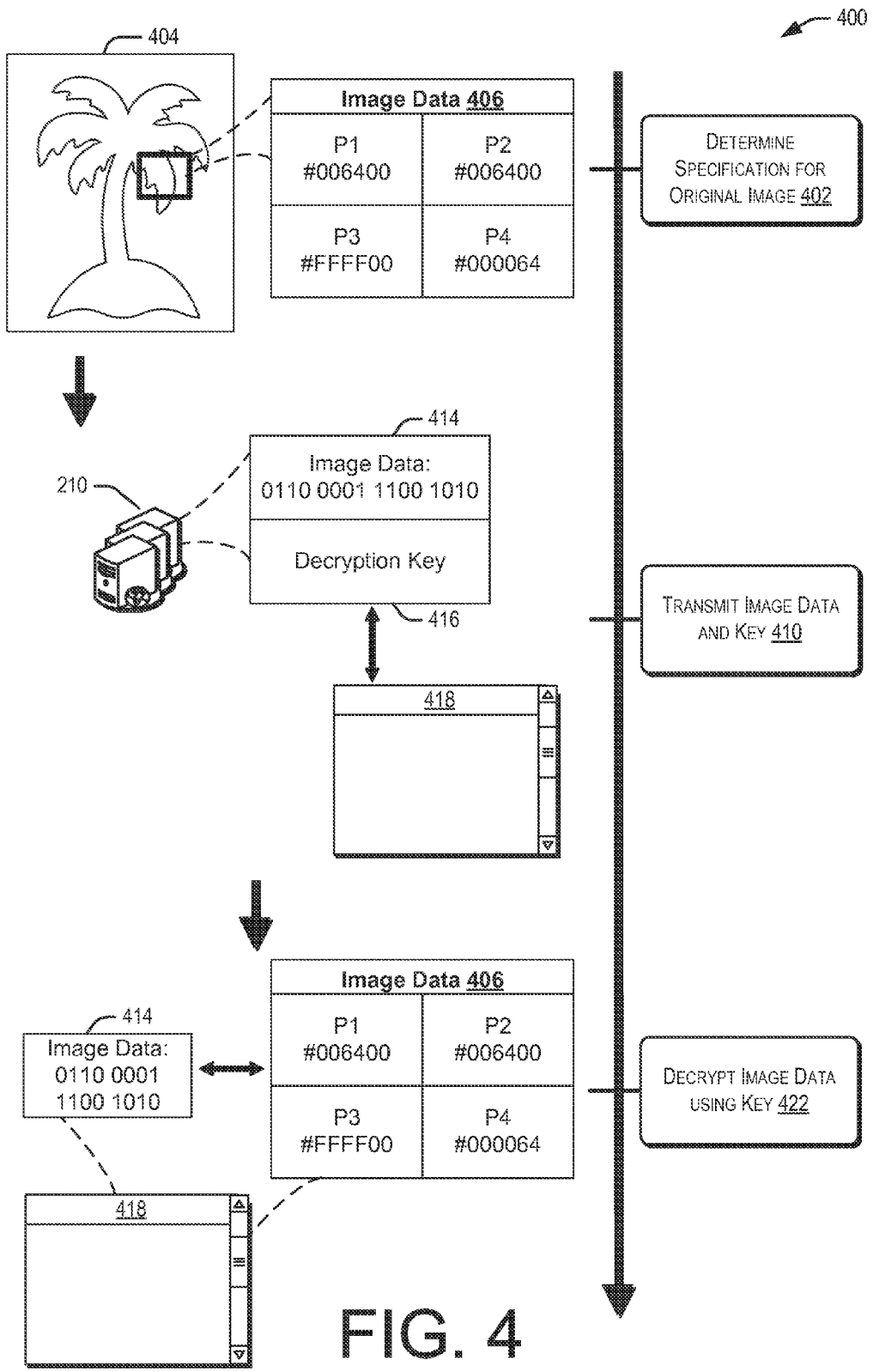
FIG. 4 illustrates an illustrative flow for providing image download protection described herein, according to at least one example.

FIG. 4 illustrates an illustrative flow for providing image download protection described herein, according to at least one example. In a non-limiting example, the method 400 can determine a specification for an original image 402. For example, the system may first receive an original image 404 (e.g., from a data store, from an item provider). The original image 404 can include one or more pixels that are shown substantially adjacent to each other to form the original image.

In some examples, the method may identify image data 406 for the original image. For example, the system can identify the number of pixels in the original image (e.g., 100 pixels total), a specification for the original image (e.g., RGB, CYMK, B/W), one or more values for each of the pixels (e.g., 0-255), or any other image data used to define an original image. For example, as shown in FIG. 4, pixel 1 includes a value of #006400 hexadecimal color code; pixel 2 includes a value of #006400 hexadecimal color code; pixel 3 includes a value of #FFFF00 hexadecimal color code; and pixel 4 includes a value of #000064 hexadecimal color code.

The method may transmit image data and a key 410. For example, the system 210 may determine that an original image is associated with image data 414 that represents the values of the image. As shown in FIG. 4, the image data may be "0110 0001 1100 1010." The image data may be transmitted to a network page to be stored as HTML. The image data may correspond with an original image, a final image, one or more layers, or other information. In some examples, the image data may be encrypted.

A key may also be transmitted. In some embodiments, the key may include a decryption key that can help translate the transmitted image data 414 from the encrypted set of image data to a decrypted set of image data. As shown in the previous example, the original image data can be "0110 0001 1100 1010." When received by the network page 418, the encrypted image data can include "1111 0000 1110 0001."

The method 400 may decrypt the image data using the key 422. The network page 418 may incorporate instructions that can determine that the image data 414 is encrypted and that the key 416 can be used to decrypt the image data to form an image. When decrypted by the network page using the key, the image data may return to "0110 0001 1100 1010." In some embodiments, the network page 418 may display the decrypted image.

The user may review the image data using the network page 418 via a user device. In some embodiments, when the user attempts to download the image (e.g., by right-clicking the image), the network page 418 can provide the encrypted image instead of the decrypted image for the user to download to the user device.

Figure 5:
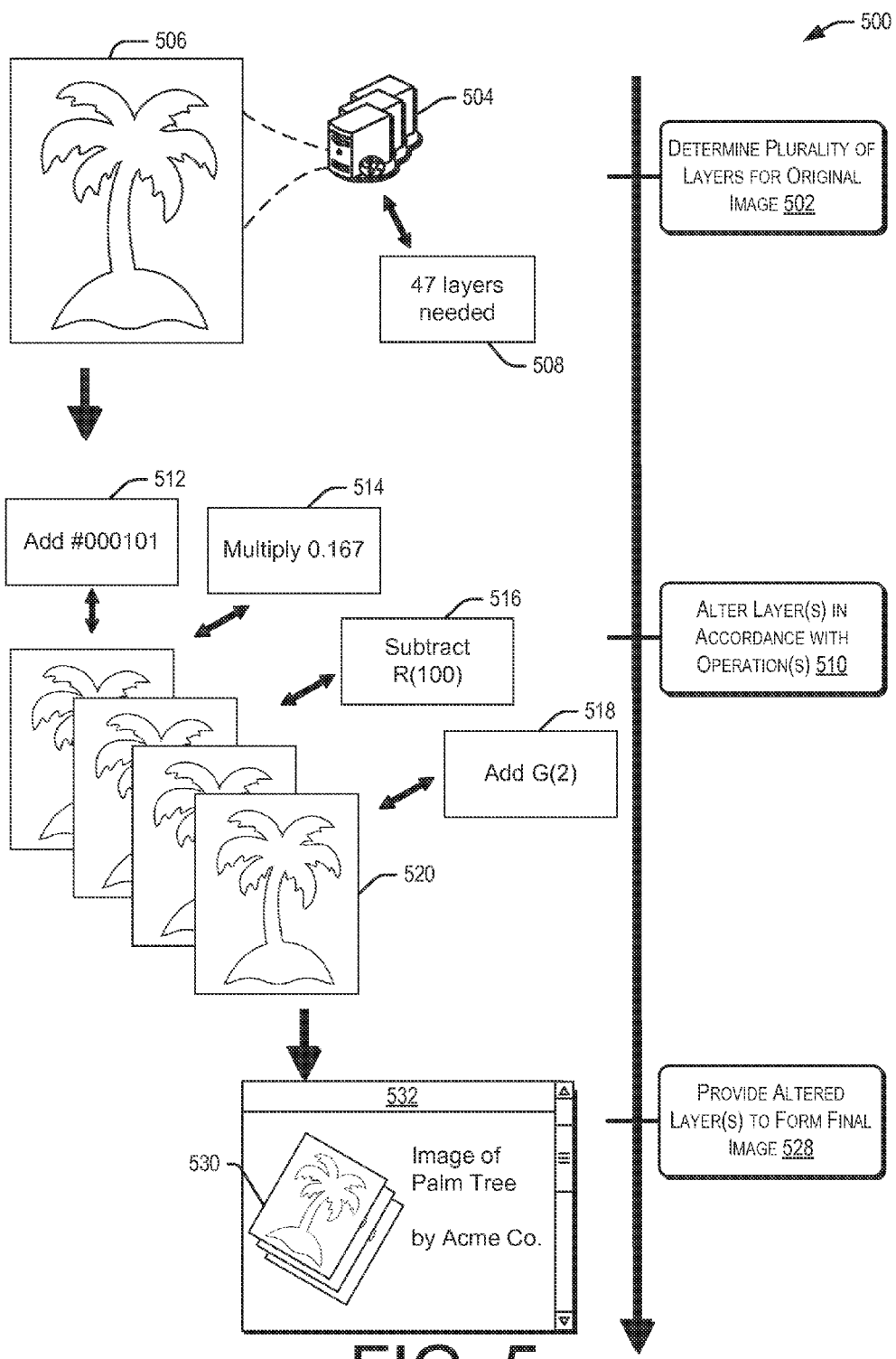
FIG. 5 illustrates an illustrative flow for providing image download protection described herein, according to at least one example.

FIG. 5 illustrates an illustrative flow for providing image download protection described herein, according to at least one example. In a non-limiting example, the method 500 can determine a plurality of layers for an original image 502. For example, the system 504 can receive an original image 506 and dynamically determine that a particular number of layers are can be used to display or transmit the image. For example, the method may determine that 47 layers may be used 508 to sufficiently protect the original image 506 during a transmission. This determination can be made using a variety of information, including providing an additional level of protection to a particularly valuable image, receiving additional fees from an item provider to incorporate the additional layers for a particular image, or any other reason for providing additional layers.

The determination regarding the number of layers for an image can be dynamically determined using a variety of methods. In some examples, the dynamic determination can be based in part on the specification for the image (e.g., three layers for an RGB specification, four layers for a CYMK specification, one layer for a grayscale specification). In some examples, the user device may determine the number of layers needed to display the final image. For example, a browser application on the user device may receive the original image, but only display a final image that incorporates the layers in accordance with the specification of the image (e.g., three layers for an RGB specification, four layers for a CYMK specification, one layer for a grayscale specification). In some examples, the HTML provided to the network page (e.g., browser application) can be instructed where to find one or more layers and how to combine the layers to produce the final image (e.g. using a Z-index in the instructions).

The method 500 may alter layer(s) in accordance with operation(s) 510. In some examples, the operations may be one or more transformations. The transformations can include logic operations, mathematical operations, and/or non-mathematical operations that change at least one color in the final image. For example, the mathematical operations may include adding, subtracting, multiplying, etc. and the non-mathematical operations may include combining a number with an operation. In some embodiments, the transformation may include one or more algorithms for transforming the image. In some embodiments, the transformation may include a series of mathematical operations that are configured to alter the image and/or one or more layers used to form the final image. In some embodiments, mathematical operations may include masking and/or shifting in bases such as base 2 and non-mathematical operations may include masking and/or shifting in bases such as base 10.

As shown in FIG. 5, a first operation 512 may include adding a value of #000101 to a layer. The second operation 514 may include multiplying the values associated with the pixels by 0.167 or a fraction (⅙). A third operation 516 may include subtracting a value from only one color in the image, including a value of 100 from all red values. A fourth operation may include adding a value to one color, including a value of 2 to all green values. The operations 512, 514, 516, 518 should be taken as being illustrative in nature, and not limiting to the scope of the disclosure, including conducting one or more operations to alter a single pixel, a subset of pixels, a portion of a layer, or an entire image. In some examples, the operations may be performed on one pixel at a time.

In some embodiments, the one or more operations may be included with instructions that are provided to the network page. For example, an altered image may be provided to the network page with instructions on one or more operations to use with the altered image to form and/or assemble the original image. In other examples, the original image may be provided to the network page with instructions on one or more operations to use with the original image to form and/or assemble an altered image. In some embodiments, the altered image may look substantially distinct from both the original image and the final image.

In some examples, the instructions for performing the operations may comprise a script, so that after the network page runs the script, the image is altered to form the original image or the final image.

The method 500 may provide the altered layer(s) to form a final image 528. In some examples, the system can provide the altered layers to a network page to form a final image at the network page. In some examples, the instructions may be provided to the system so that the system can form the final image. In some examples, the final image is formed by enabling the altered layer and the plurality of layers to be sequentially presented at a speed that allows the final image to appear substantially similar to the original image.

Figure 6:
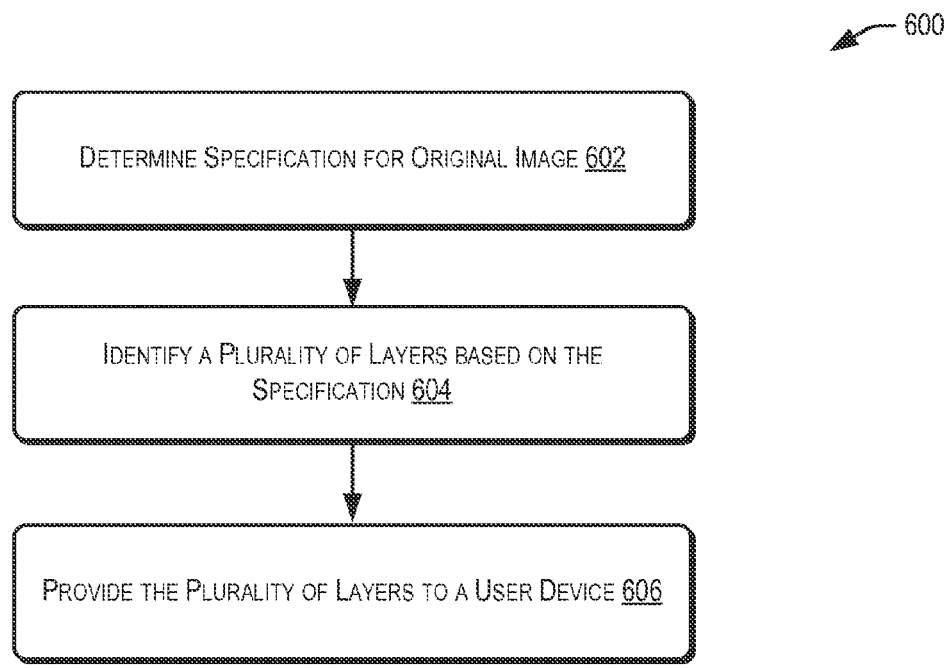
FIG. 6 illustrates an example flow diagram for providing image download protection, according to at least one example.

FIG. 6 illustrates an example flow diagram for providing image download protection, according to at least one example. In some examples, the one or more image analysis/management computers 210 (e.g., utilizing at least one of the original image module 236, the final image module 238, the pixel analysis module 240, the layering module 242, the encryption module 244, and/or the portioning/watermark module 246) shown in FIG. 2 may perform the process 600 of FIG. 6. The process 600 may begin at 602 by determining a specification for an original image. For example, the specification may include an RGB, CYMK, or other value for one or more pixels in the original image. In another example, the original image may be available for purchase through an e-commerce system. At 604, the process 600 may include identifying a plurality of layers based on or in accordance with the specification. For example, each layer may be associated with a single color identified in the original image (e.g., one layer for red, one layer for green, one layer for blue). In other examples, one layer may be associated with a portion or watermark, one layer may be associated with an operation, or other embodiments described herein. Further in some examples, the process 600 may end at 606, where the process 600 may include providing the plurality of layers to a user device. In some examples, one or more layers may correspond with instructions on assembling the one or more layers so that the layers appear in a particular order. In some examples, the plurality of layers may be presented sequentially at a speed that enables the presentation to form the final image. In some examples, the plurality of layers is presented sequentially. In some examples, the layers may be provided with instructions about assembling the layers (e.g., including the altered layer) to form a final image. In some embodiments, the final image may be configured to appear substantially similar to the original image.

Figure 7:
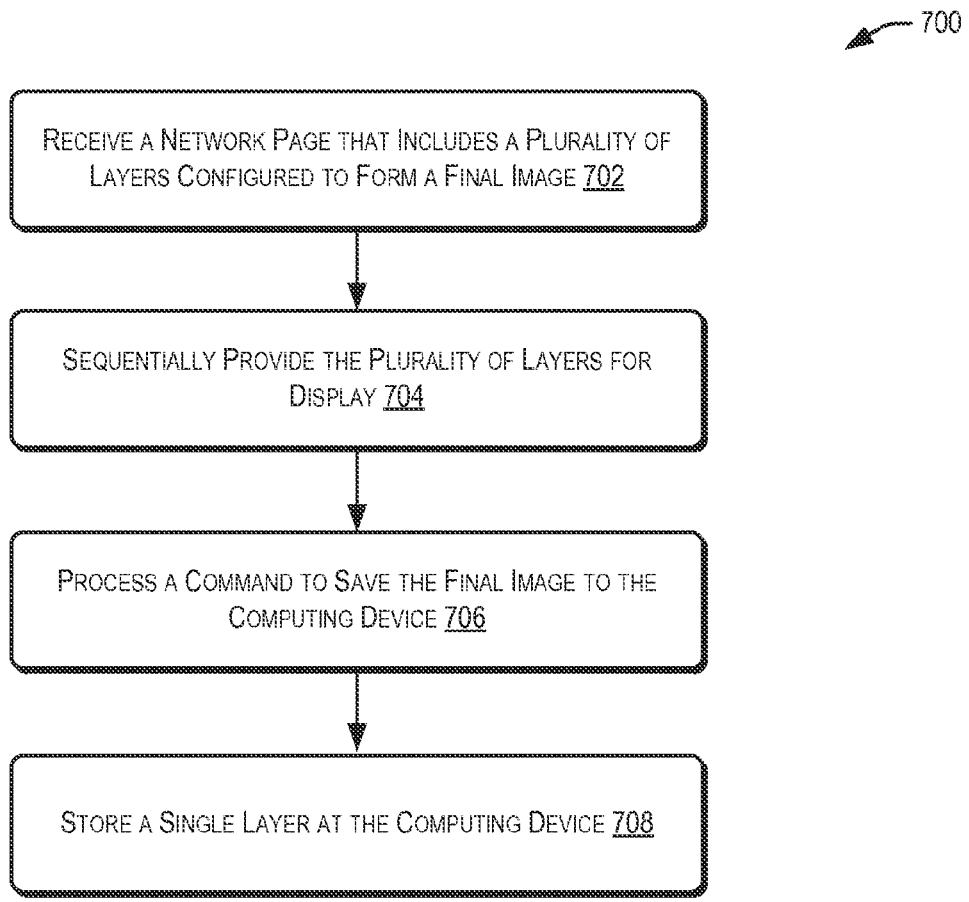
FIG. 7 illustrates an example flow diagram for providing image download protection, according to at least one example.

FIG. 7 illustrates an example flow diagram for providing image download protection, according to at least one example. In some examples, the one or more image analysis/management computers 210 (e.g., utilizing at least one of the original image module 236, the final image module 238, the pixel analysis module 240, the layering module 242, the encryption module 244, and/or the portioning/watermark module 246) or one or more user devices 204 shown in FIG. 2 may perform the process 700 of FIG. 7. The process 700 may begin at 702 by receiving a network page that includes plurality of layers that are configured to form a final image on the network page. At 704, the process may include sequentially providing the plurality of layers for display. For example, the plurality of layers can be provided sequentially at a speed that enables the final image to appear substantially similar to an original image. In some examples, the plurality of layers may at least partially overlap to form a final image at a network page displayed by the user device. In some examples, the plurality of layers may be presented sequentially at a sufficient speed such that the presentation forms the final image at a network page displayed by the user device. At 706, the process 700 may include processing a command to save at least a portion of the final image to the user device. For example, the command may include a right-click command that the user can utilize to instruct the user device to save the image. In another example, the command may include a print screen command or screen capture operation. The user can utilize the screen capture operation to save a representation of all images presented by the user device at a particular time. Further in some examples, the process 700 may end at 708, where the process 700 may include storing a single layer at the user device. The single layer can appear substantially distinct from the original image and the final image. For example, the single layer may only include red values for the pixels, whereas the original image and the final image include red, green, and blue values for the pixels. In some examples, the single layer is the layer that it presented by the network page at the time the screen capture operation is received (e.g., the second layer that is displayed for a fraction of time).

Figure 8:
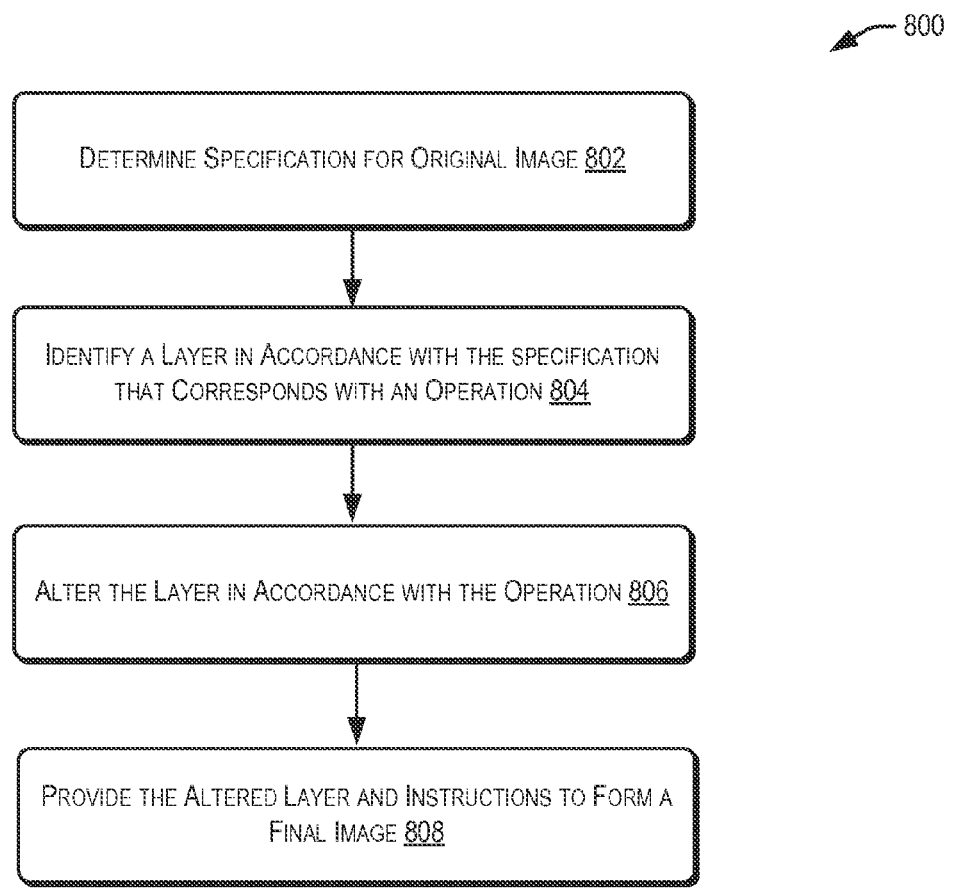
FIG. 8 illustrates an example flow diagram for providing image download protection, according to at least one example.

FIG. 8 illustrates an example flow diagram for providing image download protection, according to at least one example. In some examples, the one or more image analysis/management computers 210 (e.g., utilizing at least one of the original image module 236, the final image module 238, the pixel analysis module 240, the layering module 242, the encryption module 244, and/or the portioning/watermark module 246) or one or more user devices 204 shown in FIG. 2 may perform the process 800 of FIG. 8. The process 800 may begin at 802 by determining a specification for an original image. In some examples, the original image is an image available for purchase through an e-commerce system. At 804, the process 800 may include identifying a layer in accordance with the specification that corresponds with an operation. In some examples, the layer may be one layer in a plurality of layers that correspond with the specification of the original image. In some examples, the operation may include adding/removing color, adding/removing portions or watermarks, multiplying/dividing, or other mathematical operations that can alter the information associated with the layer and/or pixels in a layer. At 806, the process 800 may include altering the layer in accordance with the operation. In some examples, if the operation is adding 100 red, each value associated with red may increase by 100. Further in some examples, the process 800 may end at 808, where the process 800 may include providing the altered layer and instructions to form a final image. In some examples, the one or more image analysis/management computers 210 may alter the layer and provide the altered layer to a network page to assemble for the user device. In some examples, the network page at the user device 204 may receive an altered layer and assemble the layers at the network page to form the final image. In some examples, the instructions may correspond with an order of layers. In some examples, the final image is formed by enabling the altered layer and the plurality of layers to be sequentially presented at a speed that allows the final image to appear substantially similar to the original image.

Illustrative methods and systems for providing image analysis/management are described above. Some or all of these systems and methods may, but need not, be implemented at least partially by architectures such as those shown at least in FIGS. 1-8 above.

Figure 9:
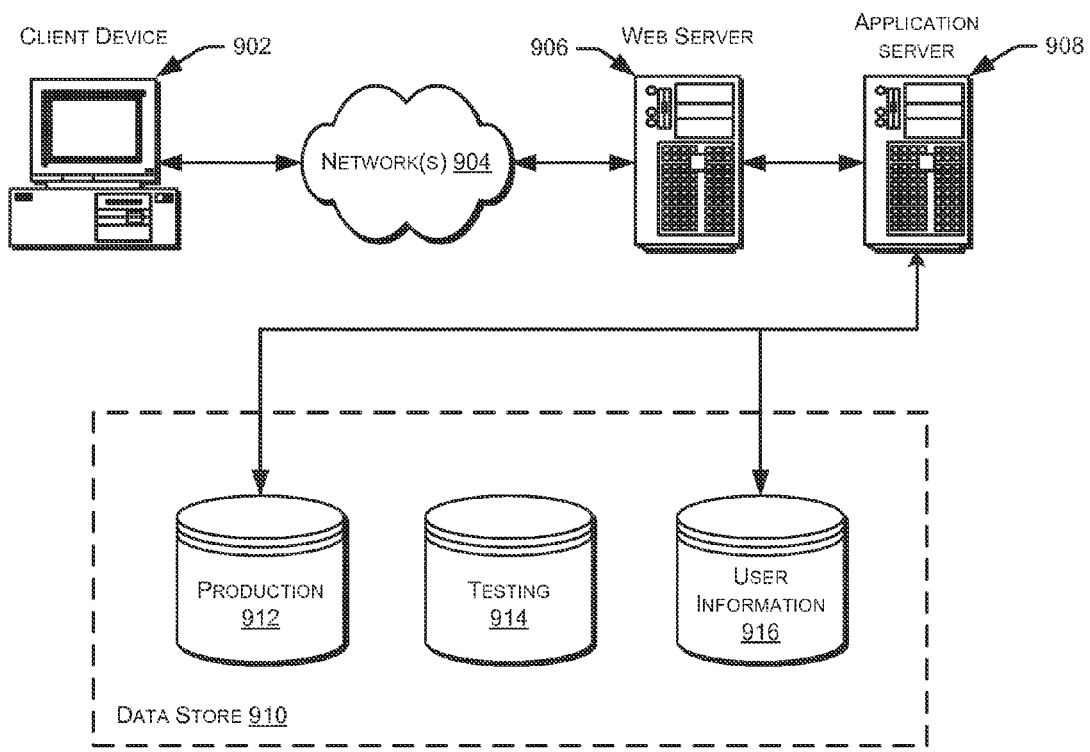
FIG. 9 illustrates an environment in which various embodiments of providing image download protection described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system, an original image, the original image available for purchase through an e-commerce system;
identifying one or more pixels that comprise the original image;
determining, by the computer system, a specification for the original image, the specification defining at least a first value and a second value for each of the one or more pixels;
associating the first value for each of the one or more pixels to form a first layer;
associating the second value for each of the one or more pixels to form a second layer;
identifying a plurality of layers of the original image in accordance with the specification, the plurality of layers including the first layer that corresponds with the first value and the second layer that corresponds with the second value;
providing the plurality of layers to a network page configured to be viewed at a user device, the plurality of layers configured to form a final image;
enabling the network page to present the plurality of layers sequentially at a first speed above a threshold that enables the presentation to form the final image, the final image configured to appear substantially similar to the original image when viewed at the user device at the first speed above the threshold, and the plurality of layers configured to appear substantially different from the original image when viewed at the user device at a second speed below the threshold; and
enabling less than all of the plurality of layers to be captured when the final image is selected at the user device.

2. The computer-implemented method of claim 1, wherein the specification is a red-green-blue (RGB) specification and the plurality of layers includes at least a red layer, a green layer, and a blue layer.

3. The computer-implemented method of claim 1, wherein the specification is a cyan-yellow-magenta-black (CYMK) specification and the plurality of layers includes at least a cyan layer, a yellow layer, a magenta layer, and a black layer.

4. The computer-implemented method of claim 1, wherein the specification is a watermark specification and the plurality of layers includes at least one watermark layer.

5. The computer-implemented method of claim 1, wherein the first value and the second value are numerical values between zero and 255, inclusive.

6. A computer-implemented method, comprising:
determining, by a computer system, a specification for an original image;
identifying a plurality of layers of the original image based on the specification;
providing the plurality of layers and instructions about assembling the layers to form a final image to a user device, at least one layer in the plurality of layers corresponding with a mathematical operation, and the final image being formed after completing the mathematical operation;
enabling a presentation of the plurality of layers at a first speed above a threshold that enables the presentation to form the final image, the plurality of layers presented sequentially, the final image configured to appear substantially similar to the original image at the first speed above the threshold, and the plurality of layers configured to appear substantially different from the original image when viewed at the user device at a second speed below the threshold; and
enabling less than all of the plurality of layers to be captured when the final image is selected at the user device.

7. The computer-implemented method of claim 6, wherein one or more layers in the plurality of layers corresponds to a single color identified in the original image.

8. The computer-implemented method of claim 6, wherein at least one layer in the plurality of layers corresponds to a watermark, wherein the watermark is not identified in the original image, and wherein the watermark is not visible in the final image.

9. The computer-implemented method of claim 6, wherein at least one layer in the plurality of layers corresponds with a portion that was not separately identified in the original image, and wherein the portion is not visible in the final image.

10. The computer-implemented method of claim 6, wherein at least one layer in the plurality of layers corresponds with the original image, and wherein the plurality of layers is transmitted to a network page with a decryption key to form the final image.

11. The computer-implemented method of claim 6, wherein each layer in the plurality of layers includes transparent portions that allow other layers underneath the transparent portions to be viewed on the user device unimpeded.

12. The computer-implemented method of claim 6, wherein at least one layer in the plurality of layers includes an alpha channel.

13. The computer-implemented method of claim 6, wherein the number of layers in the plurality of layers is dynamically identified.

14. One or more computer-readable non-transitory storage media collectively storing computer-executable instructions that, when executed by one or more computer systems, configure the one or more computer systems to collectively perform operations comprising:
  receiving, at a computing device, a network page that includes a plurality of layers that are configured to form a final image on the network page;
  sequentially providing the plurality of layers for display, the plurality of layers provided sequentially at a first speed above a threshold that enables the final image to appear substantially similar to an original image at the first speed above the threshold, the plurality of layers configured to appear substantially different from the original image when viewed at the computing device at a second speed below the threshold, the original image being available for purchase through an e-commerce system, and the plurality of layers formed from the original image;
  processing, at the computing device, a command to save the final image to the computing device;
  enabling a subset of the plurality of layers that is less than all of the plurality of layers to be captured in response to the command to save the final image; and
  storing, at least in response to the command to save the final image, at least one layer of the subset layer of the plurality of layers at the computing device.

15. The one or more computer-readable non-transitory storage media of claim 14, wherein the original image is a high-resolution image that is offered to a user operating the computing device.

16. The one or more computer-readable non-transitory storage media of claim 14, wherein a location of the original image is identified in hypertext markup language (HTML) for the network page.

17. The one or more computer-readable non-transitory storage media of claim 16, wherein the command is associated with a right click operation or a screen capture operation.

18. A system, comprising:
  at least one memory that stores computer-executable instructions; and
  at least one processor configured to access the at least one memory, wherein the at least one processor is configured to execute the computer-executable instructions to collectively at least:
    determine a specification for an original image that is available for purchase through an e-commerce system;
    identify at least one layer in a plurality of layers of the original image in accordance with the specification, the at least one layer corresponding with an operation;
    alter the at least one layer in accordance with the operation to create an altered layer;
    provide the altered layer and instructions for assembling the altered layer with the plurality of layers, the altered layer and the instructions for assembling the altered layer used to form a final image, the final image formed by enabling the altered layer and the plurality of layers to be sequentially presented at a first speed above a threshold that allows the final image to appear substantially similar to the original image at the first speed above the threshold, and the plurality of layers configured to appear substantially different from the original image when viewed at a user device at a second speed below the threshold; and
    enable less than all of the plurality of layers to be captured when the final image is selected at the user device.

19. The system of claim 18, wherein the operation is a transformation that changes at least one color in the final image.

20. The system of claim 18, wherein the original image visually represents, to a user, an item offered by an electronic marketplace of items.

21. The system of claim 18, wherein the final image is used in part to identify an item in an electronic marketplace.

* * * * *

UNITED STATES PATENT AND TRADEMARK OFFICE
CERTIFICATE OF CORRECTION

PATENT NO.       : 9,449,250 B1
APPLICATION NO.  : 14/085569
DATED            : September 20, 2016
INVENTOR(S)      : Cherry et al.

It is certified that error appears in the above-identified patent and that said Letters Patent is hereby corrected as shown below:

In the Claims

Column 23, Line 27, Claim 14 delete "subset layer" and insert -- subset -- therefor.

Signed and Sealed this
Third Day of January, 2017

Michelle K. Lee
*Director of the United States Patent and Trademark Office*